United States Patent [19]

Murphy

[11] Patent Number: 4,467,216
[45] Date of Patent: Aug. 21, 1984

[54] MULTIPLE FIXED HYDRAULIC GEOMETRY TURBINE CONTROL SYSTEM

[75] Inventor: Robert E. Murphy, Boise, Id.

[73] Assignee: J-U-B Engineers, Inc., Boise, Id.

[21] Appl. No.: 365,971

[22] Filed: Apr. 6, 1982

[51] Int. Cl.³ .............................................. H02P 9/04
[52] U.S. Cl. ..................................... 290/43; 290/40 R; 290/52; 307/29; 307/84; 307/86; 307/65; 415/10
[58] Field of Search ............... 60/39.182, 609; 91/366; 290/4 A, 30 R, 40 R, 43, 52; 318/561; 307/29, 57, 65, 84, 86, 87; 361/20, 51, 78, 240; 364/494; 415/10, 17

[56] References Cited

U.S. PATENT DOCUMENTS

| | | | |
|---|---|---|---|
| 2,861,195 | 11/1958 | Salzer | 290/52 |
| 3,300,647 | 1/1967 | Gogia et al. | 307/65 |
| 3,556,668 | 1/1971 | Marbukh et al. | 415/10 |
| 3,651,331 | 3/1972 | Raeber | 307/84 |
| 3,703,663 | 11/1972 | Wagner | 307/86 X |
| 3,842,249 | 10/1974 | Geyer et al. | 307/86 X |
| 3,848,171 | 11/1974 | Speth et al. | 415/17 X |
| 3,935,488 | 1/1976 | Spirk et al. | 290/52 X |
| 3,939,356 | 2/1976 | Loane | 290/52 |
| 4,164,661 | 8/1979 | Hucker et al. | 307/84 X |
| 4,195,231 | 3/1980 | Reed et al. | 290/40 R |
| 4,201,923 | 5/1980 | Reed et al. | 290/40 R |
| 4,201,924 | 5/1980 | Uram | 290/40 R |
| 4,245,163 | 1/1981 | Phillipe | 307/29 X |

Primary Examiner—J. V. Truhe
Assistant Examiner—Terry Flower
Attorney, Agent, or Firm—Harvey B. Jacobson

[57] ABSTRACT

A plurality of selected fixed hydraulic geometry turbine generators are programmed for operation at rated efficiencies by interrupting flow to the turbines under control of a programmable power controller receiving water level, flow and power monitoring inputs. The turbines selected are of discreet sizes simultaneously operative only under maximum flow conditions of the hydropower source, and otherwise operated in accordance with an optimum duty schedule to match varying flow conditions.

10 Claims, 5 Drawing Figures

MULTIPLE FIXED HYDRAULIC GEOMETRY TURBINE CONTROL SYSTEM

BACKGROUND OF THE INVENTION

This invention relates to multiple turbine-generator control systems for hydroelectric power installations.

Power control systems for hydroelectric turbine driven generators generally involve the internal regulation of turbine operation. Operation of two or more hydraulic turbines are, for example, regulated through inflow valves or gates for speed and power control purposes to match load demand according to U.S. Pat. No. 4,245,163 to Philippe. According to U.S. Pat. No. 3,848,171 to Speth, turbine blades are adjusted automatically under variable flow conditions to obtain maximum efficiency. A speed controlling valve of gate is utilized for turbine control in a feedback mode of operation in a hydroelectric power environment according to U.S. Pat. No. 3,556,668 to Murbukh.

Load sharing, multiple turbine driven generators are disclosed in U.S. Pat. Nos. 4,164,661, 4,195,231, 3,651,331 and 3,703,663. None of the turbines disclosed in the foregoing patents are associated with the variable flow, hydropower sources since the control systems are usually designed to meet load demand. The use of a control system to match turbine performance with load for maximum efficiency is taught in U.S. Pat. No. 3,300,647 to Gogia.

Despite the availability of various prior art multiple turbine-generator power generating systems as referred to herein, there are certain drawbacks in such systems for which there is a renewed interest for small scale hydroelectric power generating plants, below 5 megawatts, for example. The turbine-generator adjustments necessary to meet varying water flow rates are costly and less than satisfactory for such small scale hydropower plants because of reduced turbine efficiency. The usual hydraulic turbine, for example, having provisions for adjusting flow to handle flow decreased to a lower limit of 30% of rated flow, will have a reduced efficiency of 80% to 85% of its design efficiency. The ability to handle varying flow is necessary because a 100% continuous flow condition is rarely found in hydropower sites. As to fixed hydraulic geometry turbines that are less costly and capable of being mass produced, use thereof is not now deemed to be a viable alternative because of a drop in rated efficiency to 80% of rated value at 80% of rated flow and toward zero efficiency at 40% of rated flow.

It is therefore an important object of the present invention to provide a more cost effective and efficient hydroelectric power plant, especially useful for small hydropower sites, utilizing a plurality of less costly fixed geometry hydraulic turbines operating with maximum efficiency despite varying flow conditions.

SUMMARY OF THE INVENTION

In accordance with the present invention, a plurality of fixed hydraulic geometry turbines of different discreet sizes with associated generators of the induction type are selected for a given hydropower site to provide maximum energy recovery under variable flow conditions. The turbines have no adjustments or variable inflow controls, but are instead enabled or disabled in accordance with an optimum on-off duty schedule programmed into a power controller to match varying water flow conditions. Each turbine when in operation therefore operates at its rated efficiency to provide maximum operating efficiency for the power plant with output power that varies depending on the water flow available from the hydropower source. The power controller operates through control gates to interrupt flow to selected turbines and open circuit breakers for associated generators in accordance with input data from water level, flow and power monitoring sensors and a duty scheduling program. Data logging and remote data communicating functions may also be performed for data display and program updating purposes. Thus, operation of each turbine is so limited that it operates only at its rated efficiency in a programmed schedule providing an optimum selection necessary to match varying water flow conditions.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF DRAWING FIGURES

DETAILED DESCRIPTION OF PREFERRED EMBODIMENTS

Figure 1:
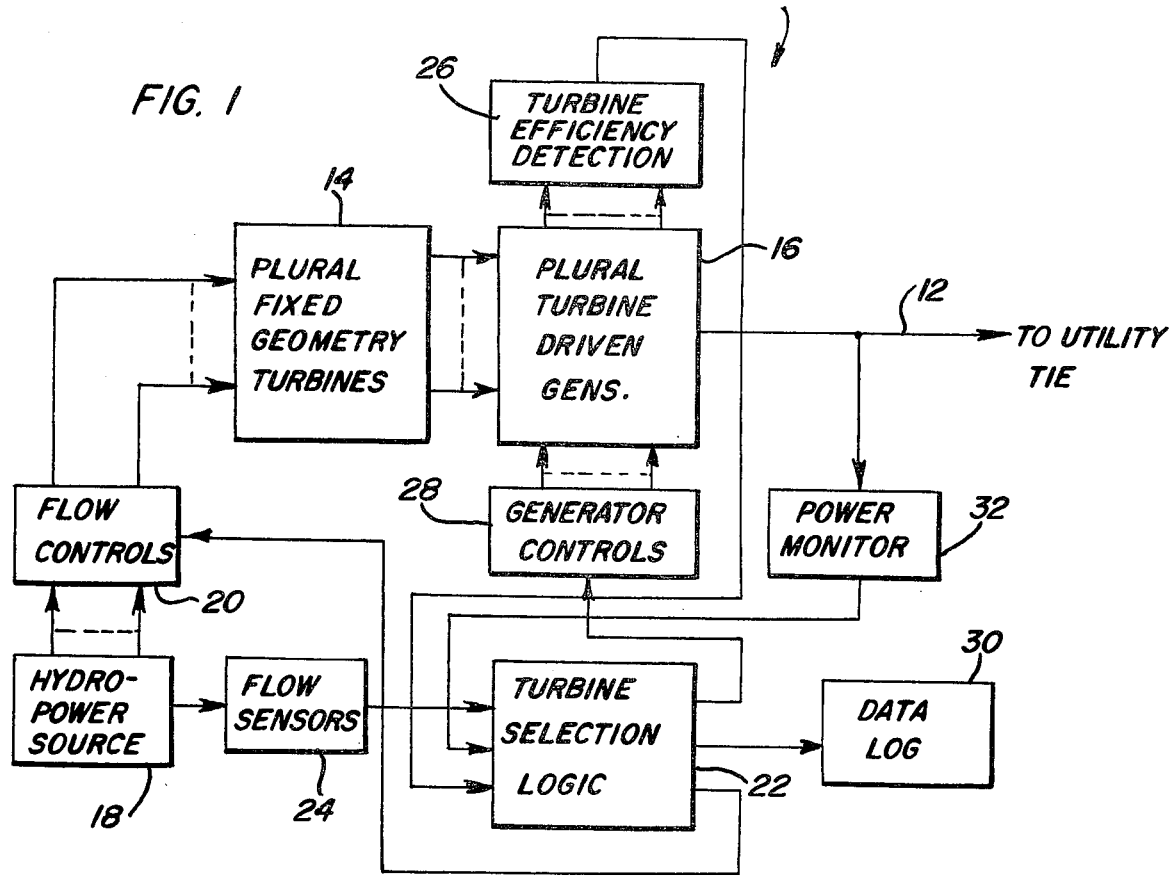
FIG. 1 is a schematic block diagram of the control system associated with a hydropower installation in accordance with the present invention.

Referring now to the drawings in detail, FIG. 1 illustrates a hydroelectric power generating installation generally referred to by reference numeral 10 from which generated electrical energy is supplied through a power output bus 12 to a utility power grid. The installation 10 includes a plurality of fixed hydraulic geometry turbines 14 respectively driving induction generators 16 supplying the electrical energy to the common output bus 12 without any load or voltage controls. Each of the turbines 14 and associated generators 16 are of a mass produced type of proven design and cost-effectiveness, with fixed hydraulic orifices and no means to control the amount of water flow therethrough. Such turbines operate at a rated efficiency when an optimum flow of water is conducted therethrough dependent on the size of the turbine. Thus, such turbines cannot individually handle variable flow conditions since the efficiency thereof will drop for example from 100% rated value under 100% optimum flow toward zero efficiency below 40% optimum flow.

Energy is derived from a hydropower source 18, such as a body of water at an elevation above the turbines from which a variable flow is available. Flow valves or gates 20 control water flow at optimum flow rates from source 18 parallel to the respective turbines 14 during operation as shown. Operation of one or more of the turbines 14 may be interrupted by cut-off of flow thereto from source 18 through the flow controls 20 under command of turbine selection logic 22. The available flow from source 18 is sensed by flow sensors 24 from which input data is fed to the logic 22 which also receives input data from turbine efficiency detector component 26. Thus, whenever the flow from source 18 is decreased significantly below a maximum available value adapted to operate all of the turbines 14 in parallel at the rated efficiencies thereof, an output signal from the logic 22 is applied to the flow controls 24 to interrupt flow to selected ones of the turbines. Turbine selection is determined by the input data from the turbine efficiency detection component 26 and the programming of the logic 22. Outputs of the logic disable, through generator controls 28, those generators 16 drivingly connected to the inoperative turbines, and provide information to a data log 30. The output power is also monitored by power monitor 32 for providing protective shut-down control under conditions such as overload and power loss that would cause equipment damage.

Figure 2:
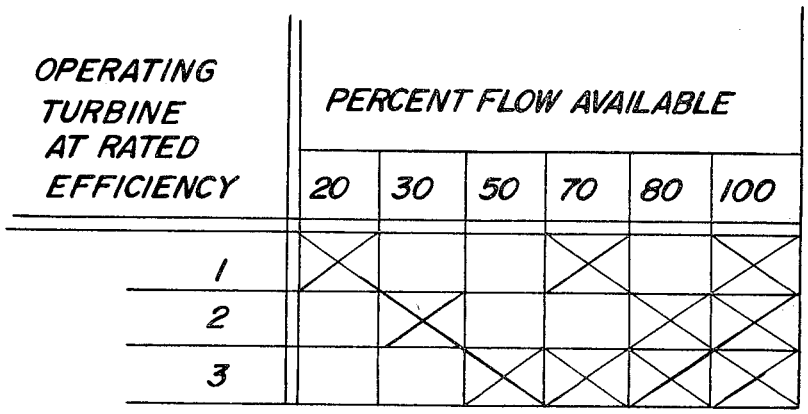
FIG. 2 is a table or chart showing a typical programmed duty schedule for three hydraulic turbines associated with one embodiment of the present invention.

By way of example, the table of FIG. 2 shows three turbines simultaneously operating at their rated efficiencies under 100% maximum flow conditions of the hydropower source. Each of the three turbines is of a different size, respectively, operating at rated efficiency when conducting 20%, 30% and 50% of the maximum water flow. At 70% flow, turbine Nos. 1 and 3 are programmed to operate, while turbines Nos. 2 and 3 are programmed to operate at 80% flow and all units at 100% flow.

Figure 3:
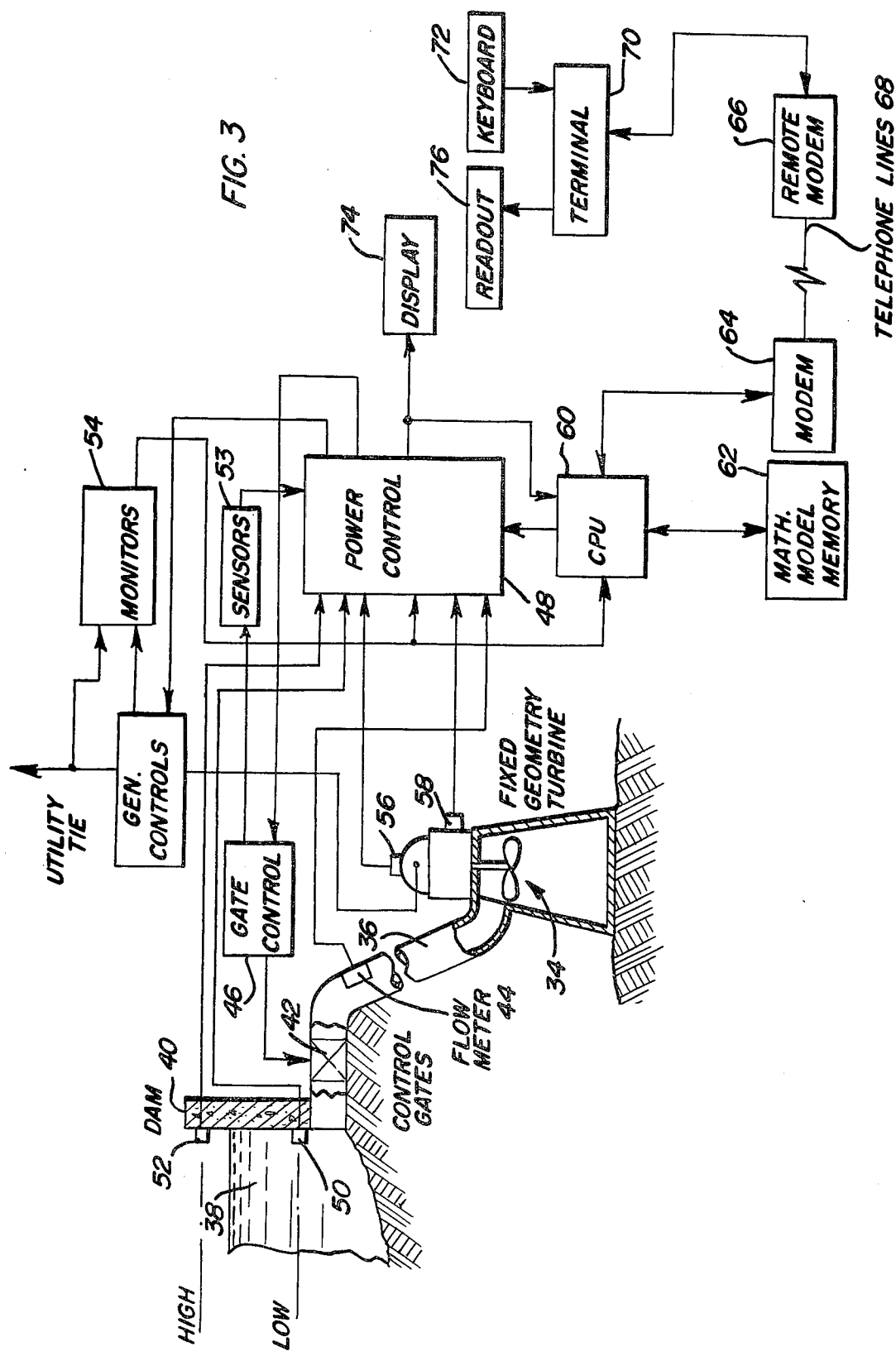
FIG. 3 is a block circuit diagram showing the control system arrangement with respect to one of the turbine-generator sets associated with the installation illustrated in FIG. 1.

FIG. 3 illustrates the control system in association with one of the turbine-generator sets, generally referred to by reference numeral 34. Water is conducted to the turbine-generator set 34 through a conduit 36 at an optimum flow rate for turbine operation at rated efficiency. The water is derived from the hydropower source 18 in the form of a body of water 38 contained by a dam 40. Flow through conduit 36 is interrupted by closing of a flow control in the form of gate 42 and is monitored by a flow meter type of sensor 44. Opening and closing of the gate is effected through a gate control 46 by an output from power controller 48 forming part of the turbine selection logic hereinbefore described with respect to FIG. 1. Signal inputs to the power controller are supplied from water level sensors 50 and 52, gate control sensors 53, monitors 54 connected to the generator controls 28 and output bus 12, generator speed sensor 56 and vibration-temperature sensor 58. Programming of the power controller is effected by a central processing unit (CPU) 60 to which a mathematical model memory section 62 is connected. Input data to the CPU 60 is received from monitors 54 and from a remote source through modems 64 and 66 interconnected by telephone lines 68. The remote source includes a terminal 70 to which an input keyboard 72 is connected. Readout of data logged by the control system may be effected through a local display 74 connected to an output port of the power controller 48 and remote readout components 76 connected to remote terminal 70.

Figure 4:
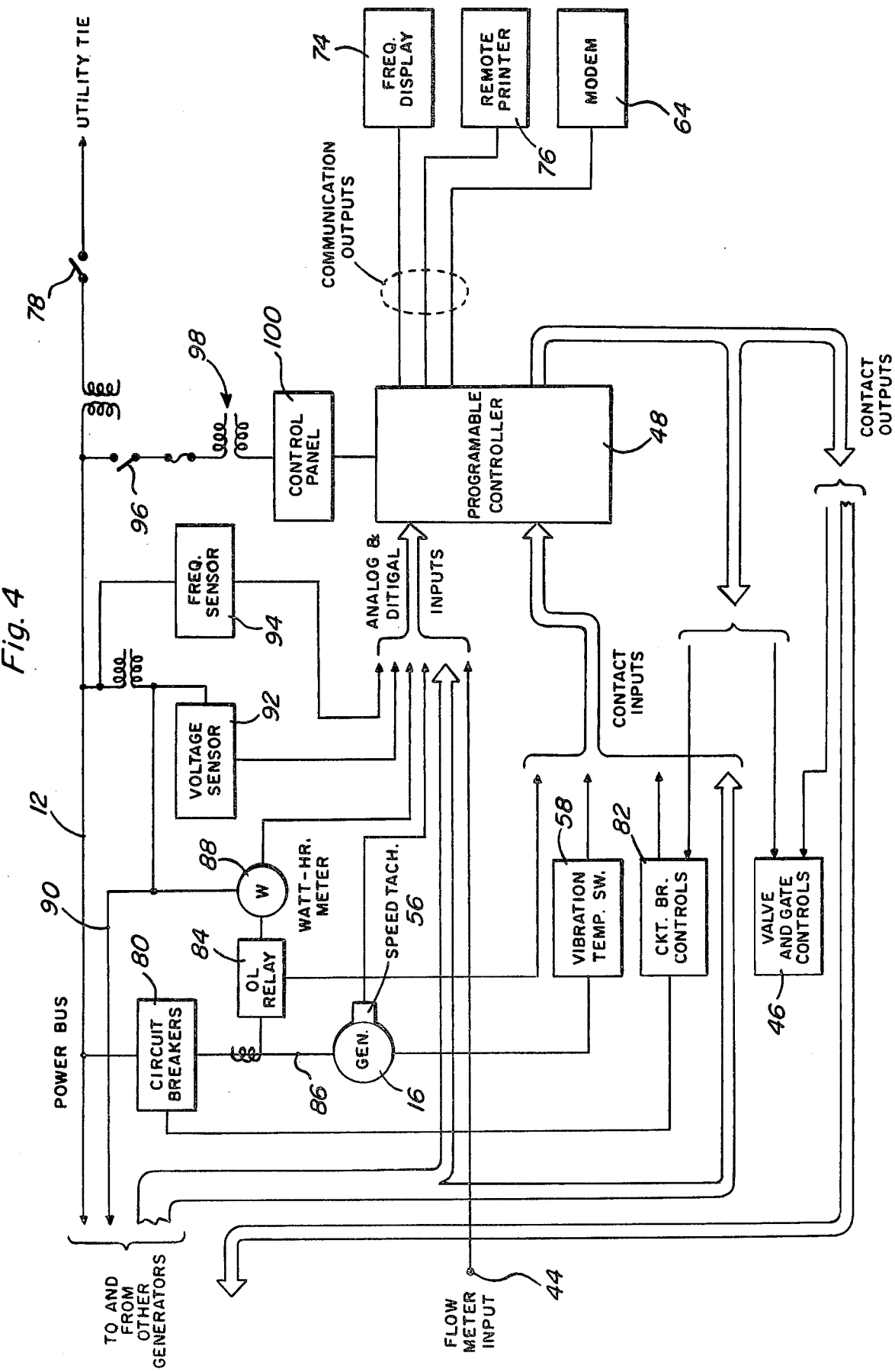
FIG. 4 is a block circuit diagram showing in greater detail the data input and output arrangement associated with the control system shown in FIGS. 1 and 3.

FIG. 4 illustrates the control system in greater detail showing the common output bus 12 coupled to a utility tie-in line through switch 78. The outputs of the generators 16 are connected through separate circuit breakers 80 to the output bus 12 under control of circuit breaker controls 82 forming part of the generator controls aforementioned. The power monitors include a separate overload relay 84 inductively coupled to the power output lines 86 of each of the generators, a watt-hr meter 88 connected to each of the generators, a voltage sensor 92 inductively coupled to the output bus and a frequency sensor 94 connected to the output bus. Power for operation of the programmable controller 48 is supplied from the output bus through switch 96, transformer 98 and control panel 100.

Digital inputs to the controller 48 are obtained from the power monitors including frequency sensor 94, voltage sensor 92, watt-hour meter 88, speed sensors 56 and flow meter 44. Switch contact closing inputs for the controller are obtained from the vibration-temperature and circuit breaker sensors associated with each of the generators. Switch controlling outputs to the flow controls 46 and circuit breakers are obtained from the output ports of controller 48 as shown, while communication outputs are also provided for the displays 74 and 76 and modem 64.

Figure 5:
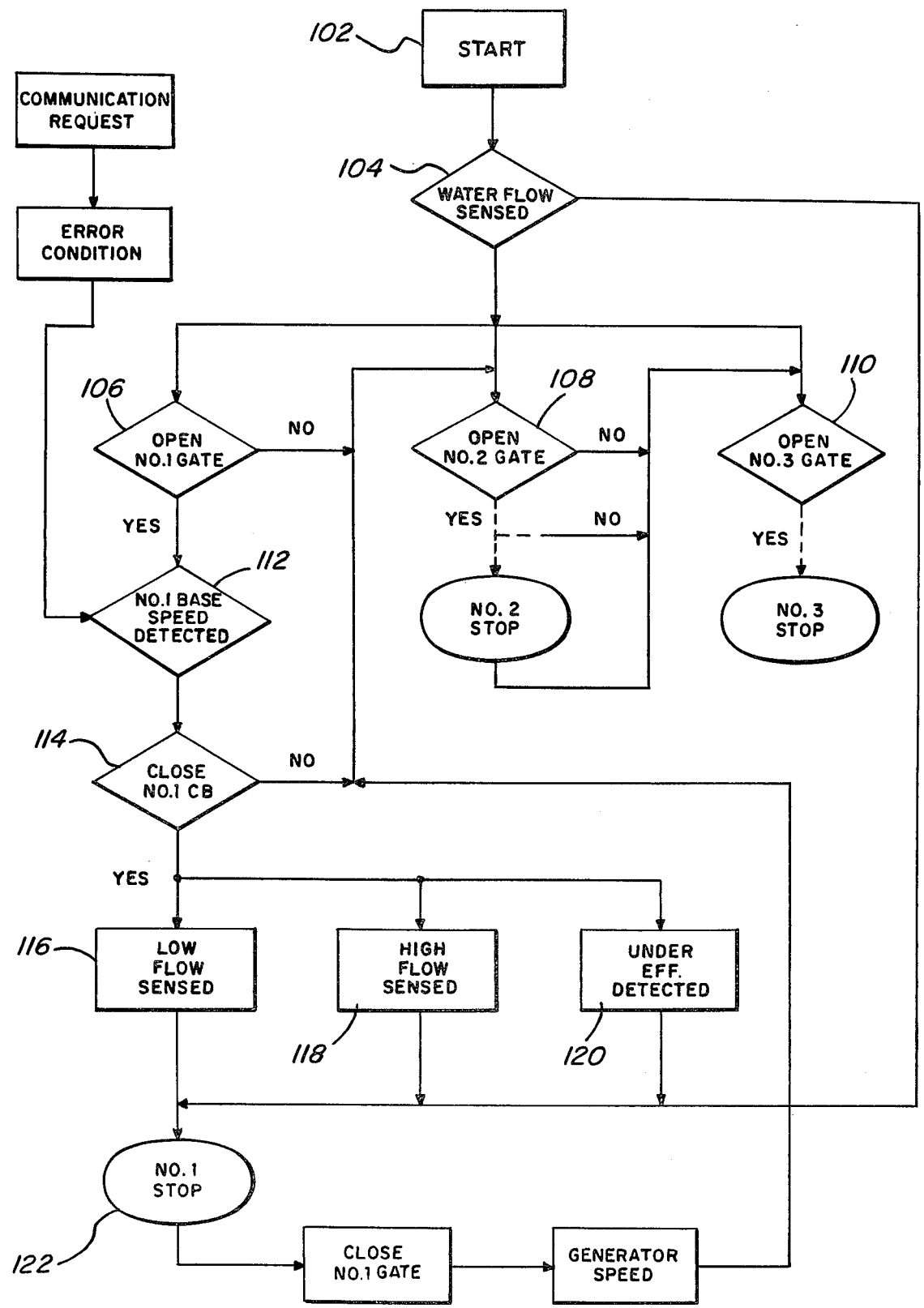
FIG. 5 is a data flow diagram showing certain logic functions associated with a control system corresponding to the table shown in FIG. 2.

FIG. 5 illustrates some of the data flow associated with the system hereinbefore described. In response to a start command at 102, water flow conditions are sensed at 104 to determine the available flow from the hydropower source. Depending on such flow conditions, none or any combination of one or more logic functions 106, 108 and 110 receive flow gate opening commands to initiate operation of the fixed geometry turbines. In response to a turbine reaching a base speed, a command is generated at 112 to provide a circuit breaker closing input to 114 in order to initiate the supply of electrical energy from a turbine-generator set operating at rated efficiency. In the event there is a significant deviation in flow to the turbine or drop in its efficiency, such conditions are sensed to produce commands at 116, 118 or 120 thereby providing a stop sequence command at 122 for one of the turbine-generator sets.

From the foregoing description it will be apparent that the present invention involves the selection of a plurality of fixed hydraulic geometry turbines of discreet sizes for any given hydroelectric installation. Such selection is based on analysis of the flow duration curves generated for all available fixed geometry turbines to provide the optimum energy recovery, unit size combination and programmed on-off duty cycle schedule. Based on such data stored and updated in the memory 62, the power controller 48 is programmed to optimize the number and size of turbines placed on duty for any given flow condition.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A method of generating energy from a variable flow hydropower source by operating in parallel a plurality of fixed hydraulic geometry turbines respectively driving electric generators connected to a common output bus, including the steps of: monitoring flow from the hydropower source to detect substantial deviation from a maximum available flow adapted to drive all of the turbines at substantially the respective rated efficiencies thereof; selecting the turbines through which flow from the hydropower source is interrupted when said deviation occurs to substantially match the monitored flow with uninterrupted flow through the remaining turbines operating with acceptable deviation from the respective rated efficiencies thereof; and enabling only the generators driven by the operating turbines.

2. The method of claim 1 including the step of: monitoring operating conditions of the turbines and the generators to modify said selection of the turbines for protection thereof against overload and loss of power in the output bus.

3. The method of claim 2 wherein the flow through the turbines operating substantially at the rated efficiencies is interrupted and restored in accordance with a programmed duty schedule to substantially match the monitored flow.

4. The method of claim 1 wherein the flow through the turbines operating substantially at the rated efficiencies is interrupted and restored in accordance with a programmed duty schedule to substantially match the monitored flow.

5. In a system of generating energy from a variable flow hydropower source by flow in parallel through a plurality of fixed geometry turbines respectively driving electric generators connected to a common output bus, flow control means for interrupting flow from the hydropower source through the respective turbines, sensing means connected to each of the generators for detecting operation of the respective turbines substantially below rated efficiencies thereof in response to decreases in flow therethrough, power control logic means operatively connecting said sensing means to the flow control means for effecting said interruption in flow through the turbines operating below the rated efficiencies to substantially match variable flow conditions of the hydropower source with total optimum flow through the turbines remaining in operation, and means for disabling the generators driven by the turbines through which flow is interrupted.

6. The combination of claim 5 including means operatively connected to the common output bus and the generators for monitoring operating conditions thereof, and means interfacing the monitoring means with the power controlling logic means for modifying selection of the turbines through which flow is interrupted to protect the generators against overload and loss of power in the output bus.

7. The combination of claim 6 said power controlling logic means includes a data processing unit through which the turbines are disabled and enabled in accordance with a programmed duty schedule.

8. The combination of claim 5 wherein said power controlling logic means includes a data processing unit through which the turbines are disabled and enabled in accordance with a programmed duty schedule.

9. The combination of claim 5 wherein said turbines are of different sizes operating at the rated efficiencies under optimum flow rates.

10. A method of generating energy from a variable flow hydropower source operating fixed hydraulic geometry turbines in parallel, including the steps of: selecting a plurality of said turbines of different discreet sizes for simultaneous operation at rated efficiencies under maximum flow conditions of the hydropower source; disabling each of the turbines when operation substantially deviates from the rated efficiency thereof; and scheduling operation of the turbines at substantially rated efficiencies in accordance with a program to substantially match varying flow conditions of the hydropower source.

* * * * *